(12) United States Patent
Taylor et al.

(10) Patent No.: US 6,967,664 B1
(45) Date of Patent: Nov. 22, 2005

(54) METHOD AND APPARATUS FOR PRIMITIVE PROCESSING IN A GRAPHICS SYSTEM

(75) Inventors: Ralph C. Taylor, Deland, FL (US); Michael Mantor, Orlando, FL (US); Michael A. Mang, Ovledo, FL (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/552,932

(22) Filed: Apr. 20, 2000

(51) Int. Cl.[7] .............................................. G09G 5/02
(52) U.S. Cl. ...................... 345/620; 345/419; 345/622; 345/623; 345/505; 345/582
(58) Field of Search ................................ 345/506, 419, 345/620, 421, 422, 505, 582, 426, 423, 427, 345/443, 623, 621, 622, 624

(56) References Cited

U.S. PATENT DOCUMENTS

| | | | | |
|---|---|---|---|---|
| 5,012,433 A | * | 4/1991 | Callahan et al. ............ | 345/623 |
| 5,369,741 A | * | 11/1994 | Hartog et al. ............... | 345/443 |
| 5,720,019 A | * | 2/1998 | Koss et al. .................. | 345/620 |
| 6,052,129 A | * | 4/2000 | Fowler et al. .............. | 345/506 |
| 6,111,584 A | * | 8/2000 | Murphy ...................... | 345/506 |
| 6,359,630 B1 | * | 3/2002 | Morse et al. ............... | 345/620 |

* cited by examiner

Primary Examiner—Kimbinh T. Nguyen
(74) Attorney, Agent, or Firm—Vedder, Price, Kaufman & Kammholz, P.C.

(57) ABSTRACT

A method and apparatus for processing graphics primitives that includes a trivial discard guard band. Such a trivial discard guard band is used for comparison operations with the vertices of graphics primitives to determine whether the graphics primitives can be trivially discarded such that no further processing of the primitives is performed. The trivial discard guard band may be based on the specific dimensions of primitives such as one-half of the width of the line primitives or the radial dimension of point primitives such that the rasterization area of such primitives is taken into account when trivial discard decisions are performed.

30 Claims, 4 Drawing Sheets

US 6,967,664 B1

METHOD AND APPARATUS FOR PRIMITIVE PROCESSING IN A GRAPHICS SYSTEM

FIELD OF THE INVENTION

The invention relates generally to graphics processing and more particularly to a method and apparatus for processing graphics primitives in a graphics system.

BACKGROUND OF THE INVENTION

Generation of images corresponding to a graphics display in a computing system is often accomplished using graphics primitives. Such primitives are known to include triangle primitives, line primitives, and point primitives. In some instances, a graphics primitive is generated that has spatial coordinates that indicate that the primitive is outside of the display area associated with the display frame. As is known, the display area is typically defined using a number of Frustum planes that correspond to minimum and maximum values for the X, Y, and Z coordinate axes. Any portion of a primitive that lies outside of the display space defined by these planes does not contribute to the image drawn to the screen.

FIG. 1 illustrates a graphical representation of a display space that includes a display area and a number of primitives that may lie in various orientations with respect to the display area. The triangle primitive is shown to lie partially within the display area and partially outside of the display area. In some prior art graphics processing systems, a clipping operation that generates a clipped primitive based on the portion of the triangle primitive which is included within the display area is generated. The clipped primitive is then processed to generate pixel data that may be included in the image displayed. Such clipping operations are complex and require a great deal of processing resources.

In order to alleviate some of the processing requirements for clipping operations, some prior art graphics processing systems include a trivial accept guard band such as that illustrated in FIG. 1. Primitives that must be at least partially drawn, or processed, that lie completely within the trivial accept guard band are simply processed without any clipping operations performed. This can be accomplished due to the construction of rasterization circuits that are capable of rasterizing primitives for display windows that are larger than the actual display area of the display. Such trivial accept operations reduce the number of primitives that are clipped, thus reducing the clip processing requirements for a system while slightly increasing the demands on the rasterization circuit. The rasterization block can typically process pixels outside the actual display area at an accelerated rate, which can make this tradeoff an overall performance enhancement.

Further simplification of the processing operations can be accomplished by including a trivial discard option when a graphics primitive is presented for processing. In prior art systems, the coordinates of the vertices of each primitive are compared with the minimum and maximum coordinates of the display area, and if all of the vertices lie external to a particular Frustum plane corresponding to one of the coordinate axis, the primitive is discarded without further processing. Unfortunately, some primitives may appear to lie outside of the display area based on the coordinates of their vertices, while in actuality such primitives include portions that would contribute some pixel information to the actual displayed image if they were processed rather than discarded. Two examples of such primitives are illustrated in FIG. 1.

The line primitive of FIG. 1 is defined by two line vertices that lie outside of the display area. As such, a prior art trivial discard comparison determines that the line vertices both lie outside of the Frustum plane corresponding to the maximum X coordinate value. As a result of such a determination, the line primitive is discarded and not processed. However, primitives such as lines and points, which are understood to have no actual area in a pure mathematical sense, do have a "rasterization area". Line and point primitives do produce pixel information corresponding to pixels within a rasterization area. For example, a line primitive may result in pixel data covering a rasterization area that is 12 pixels wide and 20 pixels long. As display resolutions increase, the number of pixels that a line or point "covers" may also increase. As such, even though the vertices for the line lie outside of the display area, a portion of the rasterization area corresponding to such primitives may lie within the display area. The dotted box around the line primitive in FIG. 1 corresponds to the rasterization area for the line primitive.

The point primitive of FIG. 1 includes a point vertex that lies outside of the display area while having a rasterization area that lies partially within the display area. By utilizing the coordinates corresponding to the limits of the display area to perform trivial discard operations, primitives that may actually contribute to the displayed image can be discarded. This is undesirable as it can result in aberrations to the displayed image. One example involves a vertical line moving horizontally across the screen, where the line suddenly disappears as its vertices reaches the right-most edge of the display.

Therefore, a need exists for a method and apparatus for processing primitives that ensures that aberrations to the display due to coarse trivial discard determinations are avoided.

DETAILED DESCRIPTION OF THE INVENTION

Generally, the present invention provides a method and apparatus for processing graphics primitives that includes a trivial discard guard band. Such a trivial discard guard band is used for comparison operations with the vertices of graphics primitives to determine whether the graphics primitives can be trivially discarded such that no further processing of the primitives is performed. The trivial discard guard band may be based on the specific dimensions of primitives such as one-half of the width of line primitives or the radial dimension of point primitives such that the rasterization area of such primitives is taken into account when trivial discard decisions are performed. As such, display aberrations that occur in prior art systems that perform trivial discard operations based on the display area of the display without including a guard band are avoided.

Figure 1:
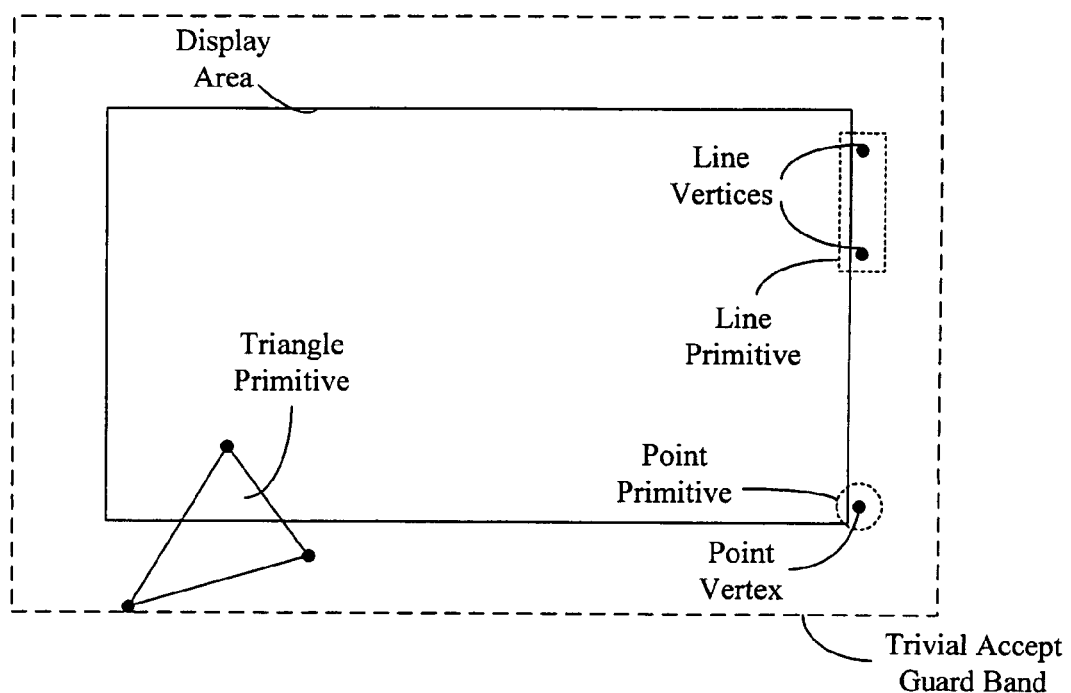
FIG. 1 illustrates a graphical representation of a display and its corresponding display area and trivial accept guard band.
Figure 2:
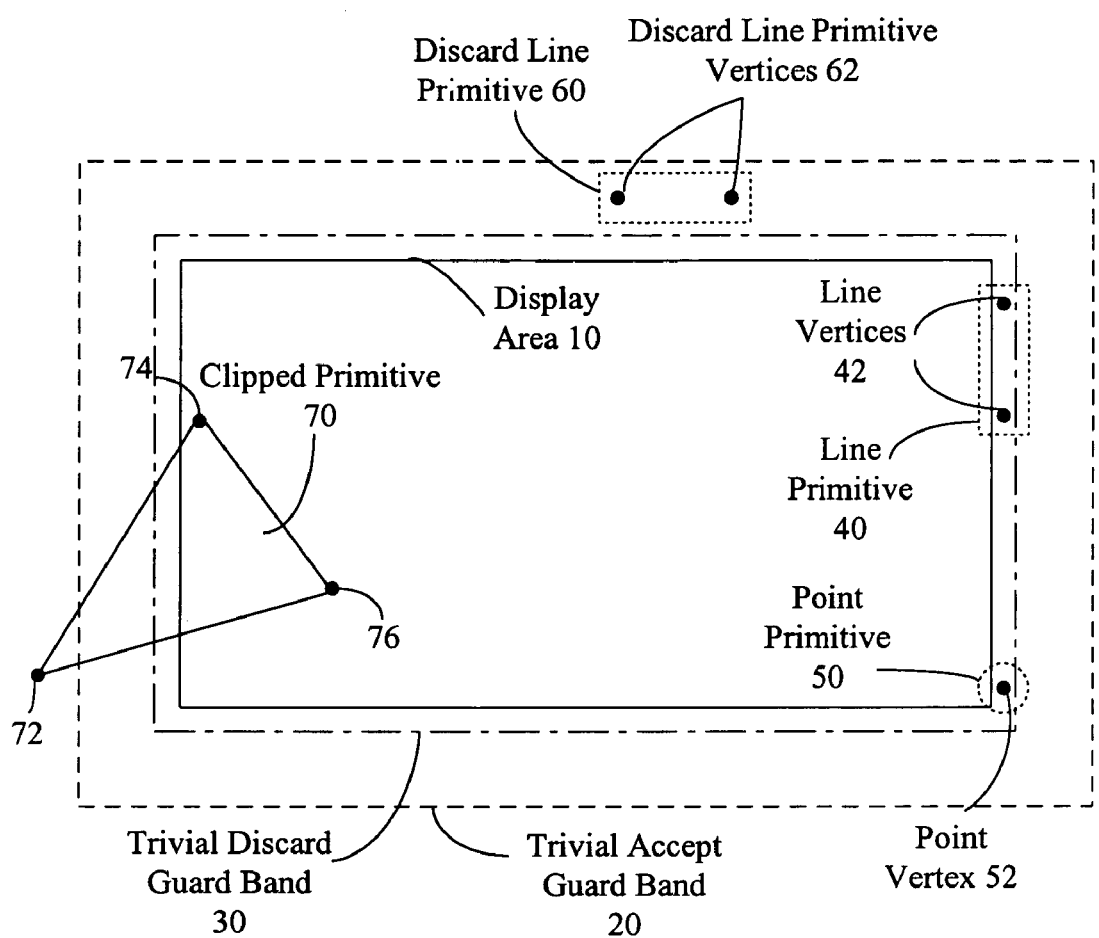
FIG. 2 illustrates a graphical representation of a display having a display area, a trivial accept guard band, and a trivial discard guard band in accordance with a particular embodiment of the present invention.

The invention can be better understood with reference to FIGS. 2–5. FIG. 2 illustrates a graphical representation of a display having a display area 10. The display area 10 preferably corresponds to portion of the displayed image from a viewer's perspective. The display area 10 is defined by screen dimensions that include minimum and maximum X values corresponding to the horizontal limits of the display area 10, as well as minimum and maximum Y values corresponding to the vertical limits of the display area 10. In three-dimensional video graphics systems, a Z dimension corresponding to a depth coordinate is also taken into account when determining whether or not a particular graphics primitive lies within the display area 10. Thus, if the Z coordinates of a primitive exceed a predetermined depth (maximum Z value), it is deemed not visible to the user and therefore is not processed.

Two guard bands relative to the dimensions of the display area 10 can be used to perform determinations as to whether and how graphics primitives presented to the graphics processing system are processed. A trivial accept guard band 20 is utilized to determine if specific primitives can simply be passed to the graphics pipeline for processing without any clipping. Such trivially-accepted primitives lie within the rasterization space of a rasterizer, where the rasterization space may exceed the actual display area 10. Such trivial accept guard bands are known in the art, and are commonly used to reduce the number of clipping operations that must be performed on primitives in order to generate the displayed image.

Typically, the rasterizer cannot accommodate all of the graphics primitives generated. For example, the clipped primitive 70, which is a triangle primitive and is defined by the vertices 72–76, exceeds the limitations of the rasterizer as indicated by the trivial accept guard band 20. Because the vertices 74 and 76 lie within the screen dimensions, at least a portion of the clipped primitive 70 is processed to generate pixel data corresponding to the clipped primitive 70. If the vertex 72 were to lie within the trivial accept guard band 20, no clipping operations would be performed and the clipped primitive 70 would simply be passed to the graphics pipeline for rasterization in its entirety. However, because the vertex 72 lies outside of the trivial accept guard band 20, the clipped primitive 70 must be clipped prior to forwarding to the graphics pipeline for subsequent processing. As stated earlier, such clipping operations may require a great deal of processing, and therefore avoiding clipping operations when possible can enhance the overall performance of the graphics processing circuitry.

Another operation that is commonly performed in order to reduce the processing resources required for primitive processing is to trivially reject any primitives that lie completely external to the display area 10. As described above, this can lead to problems when certain primitives that would actually contribute pixel data to the image data of the display frame are discarded due to the location of the vertices for those primitives. Examples include the line primitive 40 and the point primitive 50. The line vertices 42 for the line primitive 40 lie external to the display area 10 and in prior art systems that perform trivial discard operations, the line primitive 40 is discarded. However, as described above, a rasterization area (shown by the dotted rectangle) is associated with the line primitive 40, where the rasterization area may extend onto the display area 10 even though the line vertices 42 lie external to the display area 10. Note that the dimensions of the rasterization area of the primitives 40 and 50 may be exaggerated in size with respect to the display area 10 in order to simplify explanation of the teachings provided herein.

The point primitive 50 is defined by a point vertex 52 that lies external to the display area 10. However, the rasterization area of the point primitive 50 (which extends radially outward from the point primitive vertex 52 and is illustrated by the dotted circle) may result in the generation of pixel data corresponding to pixels that lie within the display area 10 even though the point vertex 52 lies external to the display area 10. As such, the trivial discard operations associated with prior art graphics processing systems result in display aberrations when pixel data corresponding to primitives such as the line primitive 40 and the point primitive 50 is not included in the image data for the display frame.

In order to avoid discarding primitives that contribute to the image data of the frame even though their vertices lie external to the display area 10, a trivial discard guard band 30 can be included in the decision-making operations of the graphics processing system. The trivial discard guard band 30 scales the minimum and maximum X and Y values corresponding to the display area 10 such that primitives whose vertices lie at least partially within the trivial discard guard band 30 are at least partially processed rather than being discarded. As such, the contributions from the line primitive 40 and the point primitive 50 to the display frame are realized. This prevents aberrations to the display such as those that resulted from trivial discarding based on comparisons of the coordinates of primitive vertices with dimensions of the display area 10 without the inclusion of such a guard band.

Scaling the dimensions of the display area 10 may include multiplying the minimum (−Xmax, −Ymax) and maximum (Xmax, Ymax) coordinate values of the display area 10 by a scaling factor. Note that different scaling factors may be used for different coordinate axes. In other embodiments, the scaling may be accomplished by modifying each of the minimum and maximum coordinate values by an offset value that corresponds to a specific number of pixels or that is based on one or more of the dimensions of the rasterization area of primitives such as lines or points (e.g. the "width" of the rasterization area of a line or the radial dimension of the rasterization area of a point).

Preferably, the determination as to whether to discard a primitive is performed in a manner such that even though the primitive may lie within the trivial accept guard band 20, it is still discarded if it lies completely outside the trivial discard guard band 30. For example, the discard line primitive 60 is defined by the discard line primitive vertices 62, which lie completely external to the trivial discard guard band 30. Even though the discard line primitive vertices 62 lie within the trivial accept guard band 20, the discard line primitive 60 is discarded rather than processed as it will not contribute any pixel data to the display frame corresponding to the display area 10.

Figure 3:
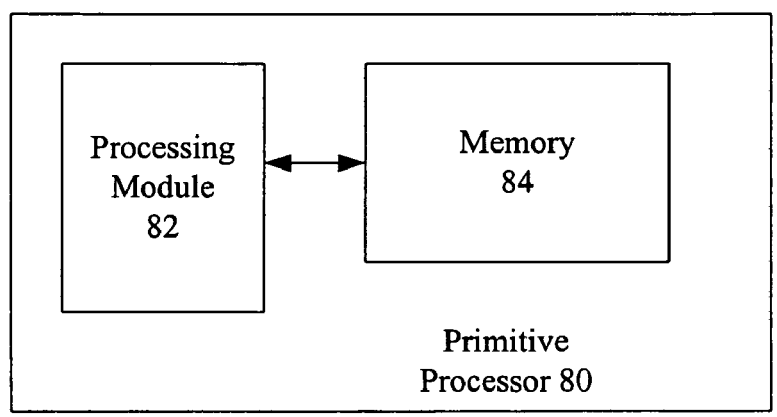
FIG. 3 illustrates a block diagram of a primitive processor that utilizes a trivial discard guard band in accordance with a particular embodiment of the present invention.

FIG. 3 illustrates a block diagram of a primitive processor 80 that includes a processing module 82 and memory 84. The primitive processor 80 may be used to perform the primitive processing functions associated with determining whether or not specific primitives should be processed, or forwarded for processing within a graphics processing system. The specific functions performed by the primitive processor 80 may be divided into a number of circuit blocks, such as those illustrated in FIG. 5, or may be performed based on software algorithms stored within the memory 84. In other embodiments, a mix of hardware and software can be used to perform the primitive processing determinations that utilize a trivial discard guard band.

The processing module 82 may include a single processing entity or a plurality of processing entities. Such a processing entity may be a microprocessor, microcontroller, digital signal processor, state machine, logic circuitry, or any device that processes information based on operational or programming instructions. The memory 84 may be a single memory device or a plurality of memory devices. Such a memory device may be a read only memory device, random access memory device, floppy disk, hard drive memory, or any device that stores digital information. Note that when the processing module 82 has one or more of its functions performed by a state machine or logic circuitry, the memory containing the corresponding operational instructions may be embedded within the state machine or logic circuitry.

Figure 4:
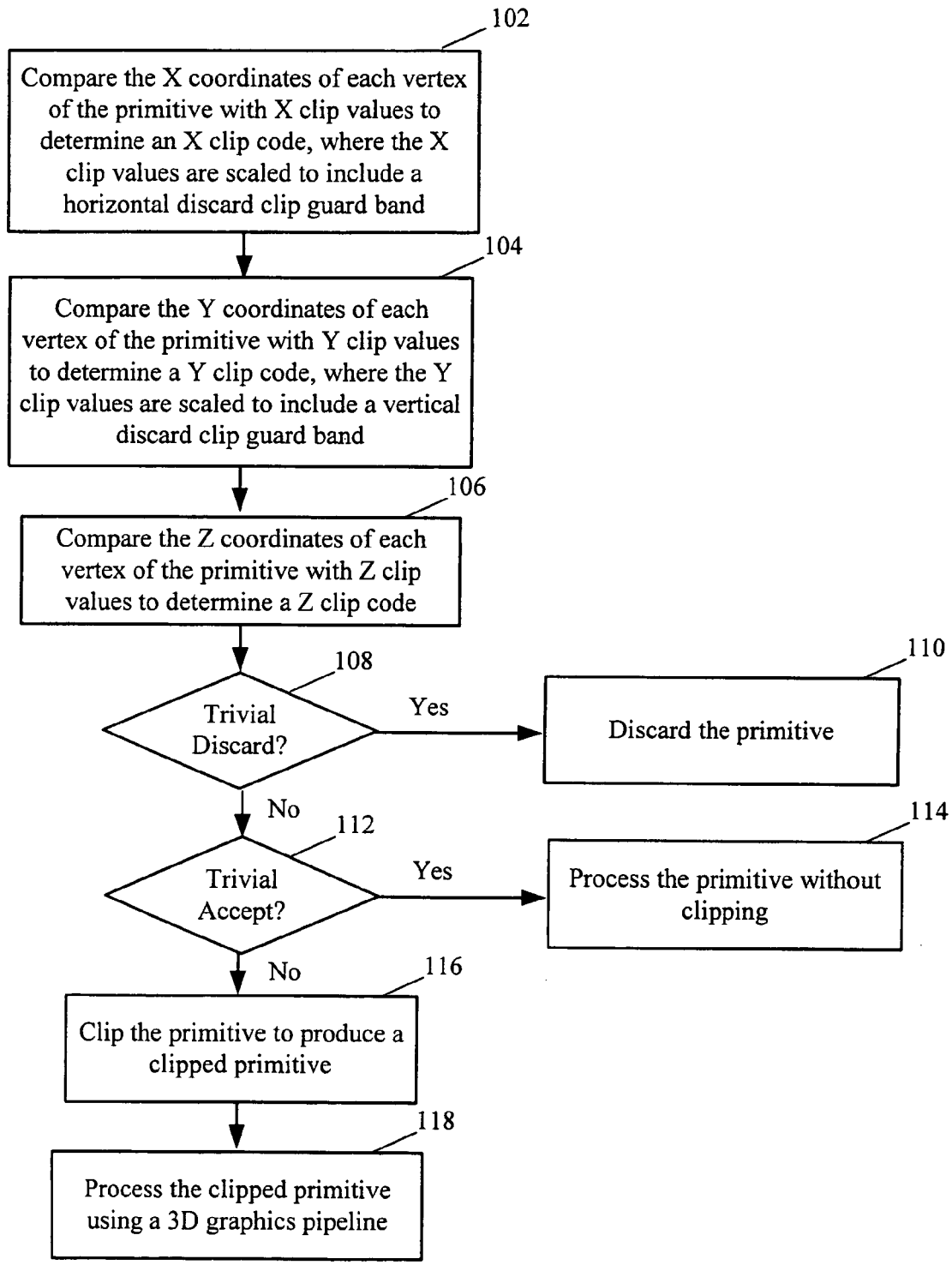
FIG. 4 illustrates a flow diagram of a method for processing a graphics primitive that includes a comparison with a trivial discard guard band in accordance with a particular embodiment of the present invention.

The memory 84 stores programming or operational instructions that, when executed by the processing module 82, enable the processing module 82 to perform at least a portion of the method illustrated in FIG. 4. The method illustrated in FIG. 4 corresponds to making processing determinations for graphics primitives such that unnecessary processing operations are avoided and those processing operations that are performed are performed in an efficient manner.

FIG. 4 illustrates a flow diagram of a method for processing a primitive in a graphics system. Each primitive received by the graphics system is defined by at least one vertex. A point primitive would be defined by one vertex, a line primitive by two vertices, a triangle primitive by three vertices, etc.

The method of FIG. 4 begins at step 102 where the X coordinates for the at least one vertex of the primitive is compared with X clip values to determine an X clip code. Thus, for each vertex of the primitive, the X coordinates for the vertex are compared with X coordinates corresponding to an X clip value to determine whether or not that vertex of the primitive lies outside of the X clip range of the display space. The X clip values correspond to the minimum and maximum X values for the display space, where these minimum and maximum X values have been scaled to include a horizontal discard clip guard band.

Referring to FIG. 2, the line primitive 40 is defined by the line vertices 42, each of which has a specific X coordinate value. These X coordinate values compare unfavorably with the dimensions of the display area 10 in an unmodified format, such that in prior art systems, the line primitive 40 is discarded based on the comparison. By scaling the dimensions of the display area 10 (display space) such that a discard guard band in the X coordinate dimension is included, the line vertices 42 are determined to lie within the trivial discard guard band 30, and therefore further processing of the line primitive occurs.

The X clip code produced at step 102 is a code that may be a simple indication that one or more of the vertices lies external to the dimensions defined by the X clip values. A specific clip code may be determined for each vertices in the case of multi-vertex primitives such that determinations as to whether all of the vertices lie outside of the same Frustum plane associated with the display can be determined.

At step 104, a similar comparison to that which occurred at step 102 is performed for the Y coordinates for each of the vertices of the primitive. The comparison operation performed at step 104 utilizes Y clip values to determine a Y clip code. The Y clip values correspond to the minimum and maximum Y values for the display space as scaled to include a vertical discard clip guard band.

At step 106, the Z coordinates for each of the vertices are compared with the Z clip values to determine a Z clip code. The Z clip values may correspond to the minimum and maximum Z values forwarded to the display space without any scaling to include a depth discard guard band. In other embodiments, a depth discard clip guard band similar to the horizontal and vertical discard clip guard band may be included.

Following the comparison operations at steps 102–106, a determination is made at step 108 as to whether the primitive can be trivially discarded. Note that the trivial discard decision performed at step 108 is based on clip codes generated in a manner that includes a trivial discard guard band such that primitives that may result in some pixel data contribution to the displayed image are not discarded simply because their vertices lie external to the actual screen dimensions. The trivial discard guard band, which is constructed based on the horizontal and vertical discard clip guard bands, may be uniform in the X and Y dimensions such that the horizontal and vertical discard clip guard bands are equivalent in size with respect to the display space. For example, the trivial discard guard band may cause the minimum and maximum acceptable X and Y coordinates to be increased by the same amount.

In other embodiments, the horizontal and vertical discard clip guard bands are based on a dimension of a rasterized area of a particular primitive. For example, the primitive may be a line primitive, and the trivial discard guard band is sized to ensure that the width of the line, which is the smaller dimension of the rasterized area of the line, is taken into account when trivial discard determinations are made. In such an embodiment, if the width of a line is ten pixels, the horizontal discard clip guard band should be sized to correspond to approximately five pixels. As such, if a vertical line were to move horizontally across the display from left to right, at the point where the vertices pass just beyond the screen dimensions, the right half of the rasterized area of the line primitive lies outside the display space. However, the area associated with the left half of the line is still present within the display space. By sizing the guard band to correspond to five pixels, the line will continue to contribute some pixel information to the display until the point where all of the rasterized area of the line lies external to the display space.

In other embodiments, the trivial discard guard band is based on the radial dimension of the rasterized area of a point primitive. As such, even though the vertex of a point may lie external to the display area, or display space, the point primitive is not discarded if a portion of the rasterization area of the point primitive that lies within the display space results in pixel data generated and displayed.

In some graphics processing systems, dimensional expansion operations are used for processing certain graphics primitives to ensure accurate image generation. One example includes the use of dimensional expansion for anti-aliasing operations that remove aliasing effects in the resulting image data. Such anti-aliasing operations may be used in conjunction with primitives having three or more vertices, such as triangle primitives. In some embodiments, the horizontal and vertical discard clip guard bands can be sized to correspond to a known amount of dimensional expansion used for such processing operations. In such embodiments, the inclusion of a trivial discard guard band can also benefit primitives having three or more vertices and ensure that an accurate display images are generated.

In yet other embodiments, the horizontal and vertical clip guard bands that define the trivial discard guard band may be sized to correspond to dimensions corresponding to a predetermined number of pixels. Thus, it may be determined in a particular system that a trivial discard guard band corresponding to four pixels is acceptable, even though a line may have a rasterization width that is ten or more pixels. As such, some premature discarding of line primitives may occur. However, because the contribution of such line primitives that are prematurely discarded would be minimal, the resulting effect to the image displayed is minimal.

Returning to FIG. 4, if it is determined at step 108 that the primitive can be trivially discarded, the method proceeds to step 110 where the discard operation is performed. Discarding may simply involve not passing any information corresponding the primitive to the remainder of the processing circuitry. In other embodiments, an indication may be passed along with the primitive such that it is discarded by a subsequent block within the graphics processing circuitry.

If it is determined at step 108 that a trivial discard of the primitive is not possible, the method proceeds to step 112 where a determination as to whether the primitive can be trivially accepted is performed. In order to determine if the primitive can be trivially accepted, comparison of the X and Y coordinates for the vertices of the primitive with trivial accept clip values may be performed. The resulting trivial accept X and & clip codes differ from the clip codes determined for those coordinates which are used for making a trivial discard determination. The trivial accept X and Y clip values correspond to the minimum and maximum X and Y values for the display space as scaled to include horizontal and vertical accept clip guard bands. These horizontal and vertical accept clip guard bands are preferably greater than the horizontal and vertical discard clip guard bands such that more tolerance is allowed for trivial accept operations. The scaling used to produce the trivial accept guard band is preferably based on the rasterization limitations of the rasterizer in the graphics processing system.

If it is determined at step 112 that all of the vertices of the primitive lie within the trivial accept guard band, the primitive may be trivially accepted, and the method proceeds to step 114. At step 114, the primitive is processed without any clipping operations being performed, where such processing preferably includes rasterization. If it is determined at step 112 that the primitive cannot be trivially accepted and clipping operations are required, the method proceeds to step 116. At step 116, clipping operations are performed on the primitive to produce a clipped primitive. Such clipping operations are known in the art and are commonly used to generate clipped primitives that lie within the display area corresponding to the processing system. The clipping operations are typically performed based on dimensions of the trivial accept guard band region. At step 118, the resulting clipped primitive is processed using a three-dimensional (3D) graphics pipeline, where such processing preferably includes rasterization operations.

Thus, by including a trivial discard guard band in the determination as to whether to trivially discard specific primitives, primitives that have no area in a pure mathematical sense, but do produce a rasterization area that may include a number of displayed pixels, are not discarded. As such, a more accurate final image is produced, and undesirable aberrations resulting from primitives having vertices which lie just beyond the screen dimensions of the display area do not occur.

Figure 5:
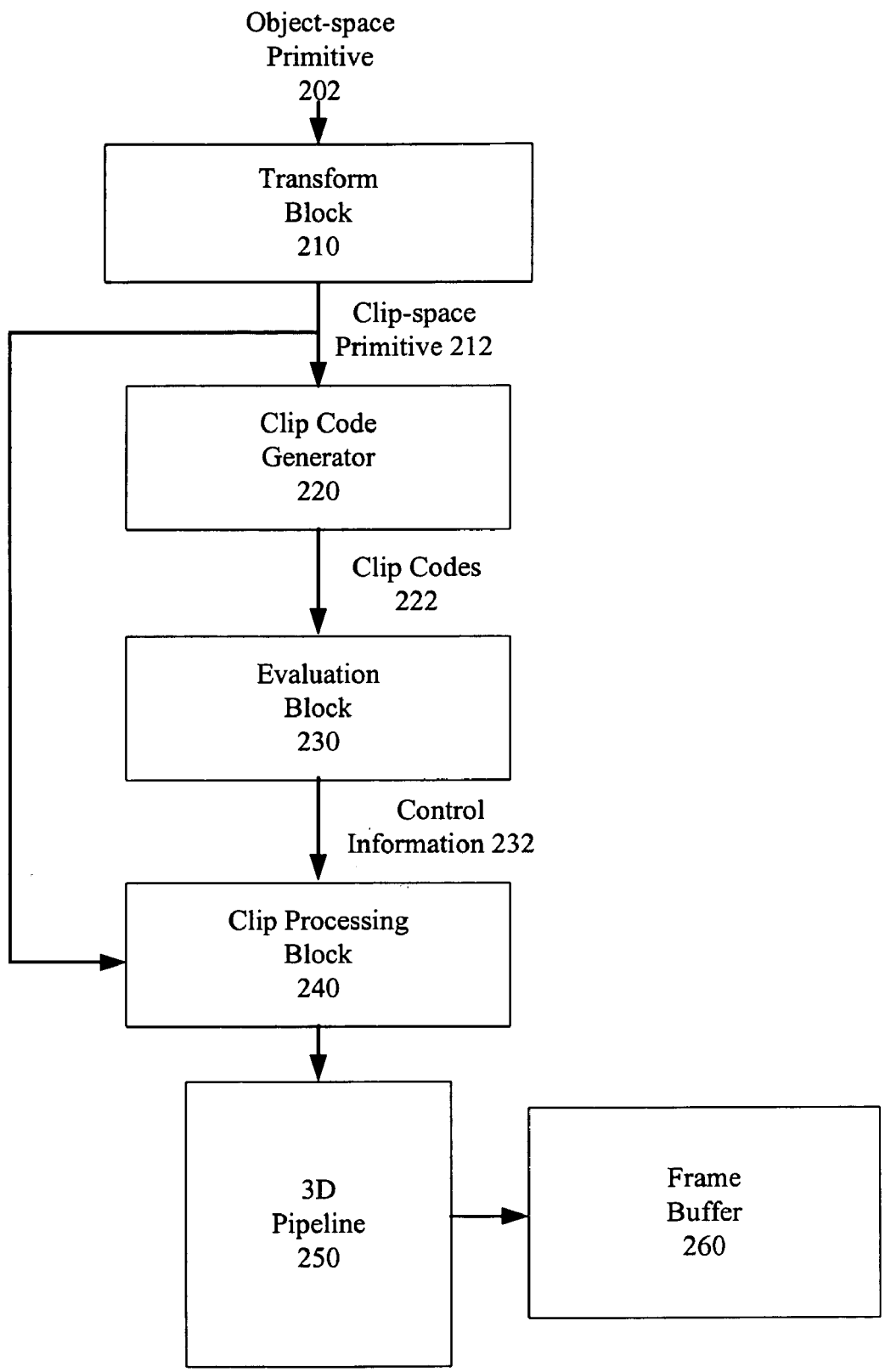
FIG. 5 illustrates a block diagram of a graphics processing circuit that utilizes a trivial discard guard band in accordance with a particular embodiment of the present invention.

FIG. 5 illustrates a block diagram of a graphics processing circuit that includes a clip code generator 220, an evaluation block 230, a clip processing block 240, and a three-dimensional graphics pipeline (3D pipeline) 250. The graphics processing circuit also preferably includes a transform block 210 and a frame buffer 260. The graphics processing circuit illustrated in FIG. 5 may be implemented on one or more integrated circuits, where such integrated circuits may be included in a graphics processing circuit used in conjunction with or included in a personal computer. Such a graphics processing circuit may be included on an expansion card for the personal computer, or on the motherboard along with a central processor that generates graphics primitives to be rendered to the display space.

The transform block 210 receives an object-space primitive 202, which is a graphics primitive defined with respect to an object space. The object space may be defined by a set of coordinates that is suitable for object processing operations or construction, whereas the clipping and rasterization operations to be performed by subsequent blocks require the primitive to be converted to clip space. The transform block 210 may perform such transformations such that a received object-space primitive 202 is transformed into a clip-space primitive 212 whose coordinates are defined with respect to a clip space suited to clipping and rasterization operations.

The clip code generator 220 receives the clip space primitive 212 from the transform block 210. The clip code generator 220 compares coordinates for the vertices of the clip space primitive with the clip space coordinates of the Frustum clip planes that have been scaled by a discard clip guard band to determine discard clip codes for the clip space primitive. The clip code generator 220 may also compare the coordinates for the vertices with the clip space coordinates of the Frustum clip planes scaled by an accept clip guard band to determine accept clip codes for the clip space primitive. The clip space coordinates of the Frustum clip planes used in such comparison operations preferably correspond to the maximum and minimum dimensions of the display area of the display.

The clip codes 222, which may include discard clip codes as well as accept clip codes, are passed to the evaluation block 230. The evaluation block 230 evaluates the discard clip codes to produce a discard decision that is included in the control information 232 that the evaluation block 230 passes to the clip processing block 240. The discard decision indicates whether or not the clip space primitive can be discarded, where such discarding is associated with a trivial discard determination. The trivial discard determination as described herein includes a guard band to ensure that the rasterization area of primitives is considered when trivial discard determinations are made.

The evaluation block 230 may also evaluate the accept clip codes to produce an accept decision that is included in the control information 232. The accept decision may correspond to a trivial accept case where the clip-space primitive 212 can be processed without any clipping operations being performed.

The clip processing block 240 receives the clip space primitive 212 and the control information 232. Based on the control information 232, the clip processing block 240 may perform a discard operation if the discard decision in the control information 232 indicates that the clip-space primitive 212 can be discarded. In other cases, the control information 232 may include an accept decision that indicates that the clip-space primitive 212 can be passed to the 3D pipeline 250 without any clipping operations being performed. In yet other cases, the control information 232 may indicate that neither a trivial accept nor a trivial discard can be performed for the clip-space primitive 212, and in such cases, the clip processing block 240 performs the clipping operations required to produce a clipped primitive that is then passed to the 3D pipeline 250. As described above, the clipping operations performed by the clip processing block 240 are well understood in the art.

When the clip space primitive 212 is to be processed without clipping, or when the clip space primitive 212 has been clipped to produce a clipped primitive, the 3D pipeline 250 processes the clip space primitive 212 or its clipped derivative to generate pixel fragment data. The 3D pipeline 250 preferably includes circuitry such as a rasterization block that performs rasterization operations on the clip space primitive 212 or its clipped primitive derivative.

The 3D pipeline 250 preferably includes a set-up engine, a raster engine, a pixel pipe, and a render backend block. The frame buffer 260 preferably includes a color buffer that stores color information corresponding to pixels in a display frame, and a Z buffer that stores corresponding Z values for the pixels included in the display frame. The 3D pipeline 250 may be included in a video graphics integrated circuit that may also include two-dimensional graphics processing and other processing blocks that may effect the data stored within the frame buffer 260. Such an integrated circuit is preferably capable of, among other things, rendering three-dimensional video graphics images for display.

The set-up engine of the 3D pipeline 250 produces primitive slope information based on received graphics primitives that are clipped or unclipped. Slope information corresponding to these primitives is provided to the raster engine, which is operably coupled to the set-up engine. The raster engine generates pixel fragments from the primitive slope information. Preferably, each pixel fragment includes a color value, a set of coordinates indicating a pixel in the display frame to which the fragment corresponds, and a Z value for the fragment.

The raster engine provides the pixel fragments to the pixel pipe, which performs various operations that may modify the color of the pixel fragment as received from the raster engine. Such operations may include texture-mapping operations. The textured fragments resulting from the operations performed by the pixel pipe are then passed to the render backend block, which is operably coupled to the frame buffer 260.

The render backend block blends textured fragments with corresponding pixel data stored in the frame buffer 260 based on the set of coordinates for each textured fragment. The Z value for each textured fragment is used to blend the fragment with the currently stored pixel information. The blending operations performed by the render backend block are well known in the art, and the resulting pixel information produced by the render backend block is stored back in the frame buffer 260. The frame buffer 260 can be accessed by display hardware to retrieve the pixel information for use in generating the display.

Including a trivial discard guard band in the determination operations used for processing graphics primitives ensures that the rasterization area of each primitive is taken into account when trivial discard decisions are made. As such, primitives that may contribute pixel information to the displayed image are not discarded when their vertices lie external to the display area of the display. Avoiding the discarding of such primitives eliminates display aberrations associated with such discards in prior art systems, thus improving overall display quality while still allowing for the reduction in processing bandwidth associated with trivial discard operations.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing a primitive defined by at least one vertex in a graphics system, comprising:
    comparing the X coordinates for the at least one vertex with X clip values to determine an X clip code, wherein the X clip values correspond to the minimum and maximum X values for the display space scaled to include a horizontal discard clip guard band which is defined as lying within a trivial accept guard band;
    comparing the Y coordinates for the at least one vertex with Y clip values to determine a Y clip code, wherein the Y clip values correspond to the minimum and maximum Y values for the display space scaled to include a vertical discard clip guard band which is defined as lying within the trivial accept guard band;
    comparing the Z coordinates for the at least one vertex with Z clip values to determine a Z clip code, wherein the Z clip values correspond to minimum and maximum Z values for the display space;
    determining if the primitive can be discarded based on the X clip code, the Y clip code, and the Z clip code;
    when the primitive can be discarded, discarding the primitive; and
    when the primitive cannot be discarded, processing at least a portion of the primitive using a three-dimensional graphics pipeline.

2. The method of claim 1, wherein processing at least a portion of the primitive further comprises rasterizing the at least a portion of the primitive.

3. The method of claim 1, wherein the horizontal and vertical discard clip guard bands are based on a dimension of a rasterized area of the primitive.

4. The method of claim 3, wherein the primitive is a line and the dimension is one-half of a smaller dimension of the rasterized area of the line.

5. The method of claim 3, wherein the primitive is a point and the dimension is a radial dimension of the rasterized area of the point.

6. The method of claim 3, wherein the horizontal and vertical discard clip guard bands correspond to an amount of dimensional expansion used for processing primitives.

7. The method of claim 6, wherein the dimensional expansion corresponds to anti-aliasing operations performed on primitives having at least three vertices.

8. The method of claim 1, wherein the horizontal and vertical clip guard bands correspond to dimensions corresponding to a predetermined number of pixels.

9. The method of claim 1 further comprises:
comparing the X coordinates for the at least one vertex with trivial-accept X clip values to determine a trivial-accept X clip code, wherein the trivial-accept X clip values correspond to the minimum and maximum X values for the display space scaled to include a horizontal accept clip guard band;
comparing the Y coordinates for the at least one vertex with trivial-accept Y clip values to determine a trivial-accept Y clip code, wherein the trivial-accept Y clip values correspond to the minimum and maximum Y values for the display space scaled to include a vertical accept clip guard band;
when the primitive cannot be discarded based on comparison with the X clip code, the Y clip code, and the Z clip code, determining if the primitive is to be processed in its entirety based on the trivial-accept X clip code, the trivial-accept Y clip code, and the Z clip code;
when the primitive is to be processed in its entirety, processing the primitive using the three-dimensional graphics pipeline;
when the primitive is not to be processed in its entirety:
clipping the primitive to produce a clipped primitive; and
processing the clipped primitive using the three-dimensional graphics pipeline.

10. The method of claim 9, wherein the vertical accept clip guard band is greater than the vertical discard guard band, and wherein the horizontal accept clip guard band is greater than the horizontal discard guard band.

11. A graphics processing circuit, comprising:
a clip code generator that is operable to receive a clip-space primitive, wherein the clip code generator compares coordinates for vertices of the clip-space primitive with screen space coordinates scaled by a discard clip guard band which is defined as lying within a trivial accept guard band to determine discard clip codes for the clip-space primitive;
an evaluation block operably coupled to the clip code generator, wherein the evaluation block evaluates the discard clip codes to produce a discard decision included in control information, wherein the discard decision indicates whether the clip-space primitive can be discarded;
a clip processing block operably coupled to the evaluation block and operable to receive the clip-space primitive, wherein when the discard decision included in the control information indicates that the clip-space primitive can be discarded, the clip processing block discards the clip-space primitive, wherein when the clip-space primitive cannot be discarded, the clip processing block selectively performs clipping functions on the clip-space primitive based on the control information to produce a clipped primitive; and
a three-dimensional graphics pipeline operably coupled to the clip processing block, wherein the three-dimensional graphics pipeline processes the clipped primitive to produce pixel fragment data.

12. The graphics processing circuit of claim 11 further comprises a frame buffer operably coupled to the three-dimensional graphics pipeline, wherein the frame buffers stores pixel data corresponding to the screen space, wherein the three-dimensional graphics pipeline blends the pixel fragment data with the pixel data.

13. The graphics processing circuit of claim 11, wherein the three-dimensional graphics pipeline includes a rasterization block, wherein processing the clipped primitive includes rasterizing the clipped primitive.

14. The graphics processing circuit of claim 11 further comprises a transform block operably coupled to the clip code generator and the clip processing block, wherein the transform block is operable to receive an object-space primitive, wherein the transform block transforms the object-space primitive from object space to clip space to produce the clip-space primitive.

15. The graphics processing circuit of claim 11,
wherein the clip code generator compares the coordinates for the vertices with clip space coordinates of Frustum clip planes scaled by an accept clip guard band to determine accept clip codes for the clip-space primitive;
wherein the evaluation block evaluates the accept clip codes to produce an accept decision include in the control information, wherein the accept decision indicates if the clip-space primitive is to be processed without clipping; and
wherein when the accept decision indicates that the clip-space primitive is to be processed without clipping, the clip processing block forwards the clip-space primitive as the clipped primitive without clipping the clip-space primitive.

16. The graphics processing circuit of claim 15, wherein the accept clip guard band is greater than the discard clip guard band.

17. The graphics processing circuit of claim 11, wherein the discard clip guard band is based on a dimension of a rasterized area of a standard primitive.

18. The graphics processing circuit of claim 17, wherein the standard primitive is a line, and wherein the dimension is one-half of a smaller dimension of the rasterized area of the line.

19. The graphics processing circuit of claim 17, wherein the standard primitive is a point, and wherein the dimension corresponds to a radial dimension of the rasterized area of the point.

20. The graphics processing circuit of claim 11, wherein the discard clip guard band is based on dimension corresponding to a predetermined number of pixels.

21. A primitive processor, comprising:
a processing module; and
memory operably coupled to the processing module, wherein the memory stores operating instructions that, when executed by the processing module, cause the processing module to perform functions corresponding to processing a primitive defined by at least one vertex, wherein the functions include:
comparing the X coordinates for the at least one vertex with X clip values to determine an X clip code, wherein the X clip values correspond to the minimum and maximum X values for the display space scaled to include a horizontal discard clip guard band which is defined as lying within a trivial accept guard band;
comparing the Y coordinates for the at least one vertex with Y clip values to determine a Y clip code, wherein the Y clip values correspond to the minimum and maximum Y values for the display space scaled to include a vertical discard clip guard band which is defined as lying within the trivial accept guard band;

comparing the Z coordinates for the at least one vertex with Z clip values to determine a Z clip code, wherein the Z clip values correspond to minimum and maximum Z values for the display space;

determining if the primitive can be discarded based on the X clip code, the Y clip code, and the Z clip code;

when the primitive can be discarded, discarding the primitive; and when the primitive cannot be discarded, processing at least a portion of the primitive using a three-dimensional graphics pipeline.

22. The primitive processor of claim 21, wherein processing at least a portion of the primitive further comprises rasterizing the at least a portion of the primitive.

23. The primitive processor of claim 21, wherein the horizontal and vertical discard clip guard bands are based on a dimension of a rasterized area of the primitive.

24. The primitive processor of claim 23, wherein the primitive is a line and the dimension is one-half of a smaller dimension of the rasterized area of the line.

25. The primitive processor of claim 23, wherein the primitive is a point and the dimension is a radial dimension of the rasterized area of the point.

26. The primitive processor of claim 23, wherein the horizontal and vertical discard clip guard bands correspond to an amount of dimensional expansion used for processing primitives.

27. The primitive processor of claim 26, wherein the dimensional expansion corresponds to anti-aliasing operations performed on primitives having at least three vertices.

28. The primitive processor of claim 21, wherein the horizontal and vertical clip guard bands correspond to dimensions corresponding to a predetermined number of pixels.

29. The primitive processor of claim 21, wherein the functions further include:

comparing the X coordinates for the at least one vertex with trivial-accept X clip values to determine a trivial-accept X clip code, wherein the trivial-accept X clip values correspond to the minimum and maximum X values for the display space scaled to include a horizontal accept clip guard band which is defined as lying within a trivial accept guard band;

comparing the Y coordinates for the at least one vertex with trivial-accept Y clip values to determine a trivial-accept Y clip code, wherein the trivial-accept Y clip values correspond to the minimum and maximum Y values for the display space scaled to include a vertical accept clip guard band which is defined as lying within a trivial accept guard band;

when the primitive cannot be discarded based on comparison with the X clip code, the Y clip code, and the Z clip code, determining if the primitive is to be processed without clipping based on the trivial-accept X clip code, the trivial-accept Y clip code, and the Z clip code;

when the primitive is to be processed without clipping, processing the primitive using the three-dimensional graphics pipeline;

when the primitive is not to be processed without clipping:

clipping the primitive to produce a clipped primitive; and processing the clipped primitive using the three-dimensional graphics pipeline.

30. The primitive processor of claim 29, wherein the vertical accept clip guard band is greater than the vertical discard guard band, and wherein the horizontal accept clip guard band is greater than the horizontal discard guard band.

* * * * *